(12) United States Patent
DeCastro et al.

(10) Patent No.: US 11,474,240 B2
(45) Date of Patent: Oct. 18, 2022

(54) GOLF RANGEFINDER DEVICE WITH INTEGRAL MAGNET MOUNT

(71) Applicant: Bushnell Inc., Overland Park, KS (US)

(72) Inventors: John DeCastro, Overland Park, KS (US); Ryne Fisher, Overland Park, KS (US); Scott O. Nyhart, Shawnee, KS (US); Timothy J. Tiel, San Diego, CA (US)

(73) Assignee: Bushnell Inc., Overland Park, KS (US)

( * ) Notice: Subject to any disclaimer, the term of this patent is extended or adjusted under 35 U.S.C. 154(b) by 914 days.

(21) Appl. No.: 16/241,718

(22) Filed: Jan. 7, 2019

(65) Prior Publication Data

US 2020/0217955 A1 Jul. 9, 2020

(51) Int. Cl.
*G01S 17/08* (2006.01)
*G01S 19/39* (2010.01)
*A63B 57/00* (2015.01)

(52) U.S. Cl.
CPC .............. *G01S 17/08* (2013.01); *G01S 19/39* (2013.01); *A63B 57/00* (2013.01)

(58) Field of Classification Search
CPC .......... G01S 19/19; G01S 19/39; G01S 17/08; A63B 57/00
(Continued)

(56) References Cited

U.S. PATENT DOCUMENTS 7,269,869 B1 * 9/2007 Ruffino ................. A63B 57/60
7/164
9,216,330 B2 * 12/2015 Beck ...................... A63B 53/06
(Continued)

FOREIGN PATENT DOCUMENTS

CN 102037502 A * 4/2011 ......... A63B 71/0669
CN 107003123 A * 8/2017 ............... G01C 3/08
(Continued)

OTHER PUBLICATIONS

International Search Report and Written Opinion regarding International Patent Application No. PCT/US19/067945; dated Mar. 18, 2020.
(Continued)

*Primary Examiner* — Atul Trivedi
(74) *Attorney, Agent, or Firm* — Walter M. Egbert, III; Richard J. Brown; Reed Smith LLP

(57) ABSTRACT

A golf rangefinder system comprises a GPS golf rangefinder device and an accessory. The golf rangefinder device comprises a housing defining a forward housing portion with a display screen viewable therein, and a rearward housing portion with a convexity projecting therefrom. A magnet centrally positioned at a distal most portion of the convexity. The accessory includes a clip with a hook-shaped member and a receptacle portion for mating with the convexity of the housing of the golf rangefinder device. A second magnet is positioned in a recess in the receptacle portion. The receptacle portion configured as a concavity and conforming to the convexity of the rangefinder device whereby when the accessory and rangefinder device are in proximity with each other they are magnetically coupled with the convexity positioned in the concavity. The accessory and rangefinder slidably rotatable and movable with respect to one another while still maintaining the magnetic coupling.

20 Claims, 11 Drawing Sheets

(58) Field of Classification Search
USPC ........................................................ 356/4.1
See application file for complete search history.

(56) References Cited

U.S. PATENT DOCUMENTS

| | | | | |
|---|---|---|---|---|
| 9,421,440 | B1* | 8/2016 | Chau .................... | G01S 19/19 |
| 11,305,695 | B1* | 4/2022 | Hubbell .................. | B60R 1/082 |
| 2004/0087383 | A1* | 5/2004 | Cope .................... | A63B 57/353 |
| | | | | 473/285 |
| 2006/0206263 | A1* | 9/2006 | Cross .................... | G09G 3/20 |
| | | | | 701/483 |
| 2008/0207357 | A1* | 8/2008 | Savarese ................ | A63B 43/00 |
| | | | | 702/158 |
| 2009/0163300 | A1* | 6/2009 | Lueders ................ | A63B 57/50 |
| | | | | 15/236.01 |
| 2011/0015001 | A1* | 1/2011 | Hafdal ................ | A63B 57/207 |
| | | | | 473/406 |
| 2011/0207558 | A1* | 8/2011 | Huffman ................ | A63B 57/50 |
| | | | | 473/406 |
| 2011/0305498 | A1* | 12/2011 | De La Rosa ........... | G01S 13/74 |
| | | | | 342/125 |
| 2012/0105283 | A1* | 5/2012 | Nyhart ................ | G01S 7/4813 |
| | | | | 342/357.57 |
| 2012/0109577 | A1* | 5/2012 | Nyhart .................... | G01C 3/08 |
| | | | | 702/159 |
| 2014/0063261 | A1 | 3/2014 | Betensky et al. | |
| 2014/0316305 | A1* | 10/2014 | Venkatraman ....... | A61B 5/0015 |
| | | | | 600/595 |
| 2016/0066714 | A1* | 3/2016 | Kunipo ................ | A47G 1/0616 |
| | | | | 40/711 |
| 2016/0210547 | A1* | 7/2016 | Dekeyser ............... | G06K 7/065 |
| 2017/0150794 | A1 | 6/2017 | Gamblin et al. | |
| 2018/0095164 | A1 | 4/2018 | Dunne | |
| 2018/0353830 | A1 | 12/2018 | Jacques | |

FOREIGN PATENT DOCUMENTS

| | | | | |
|---|---|---|---|---|
| CN | 107153183 A | 9/2017 | | |
| TW | 335712 | 7/1998 | | |
| TW | M571965 U | 12/2018 | | |
| TW | 202111282 A | * 3/2021 | ............. | A63B 57/00 |
| WO | WO-2019042956 A1 | * 3/2019 | ............. | G01S 17/46 |

OTHER PUBLICATIONS

Translation of Taiwan IPO Search Report/Office Action, regarding Taiwan Invention Patent application No. 108146972; dated Oct. 8, 2020.

* cited by examiner

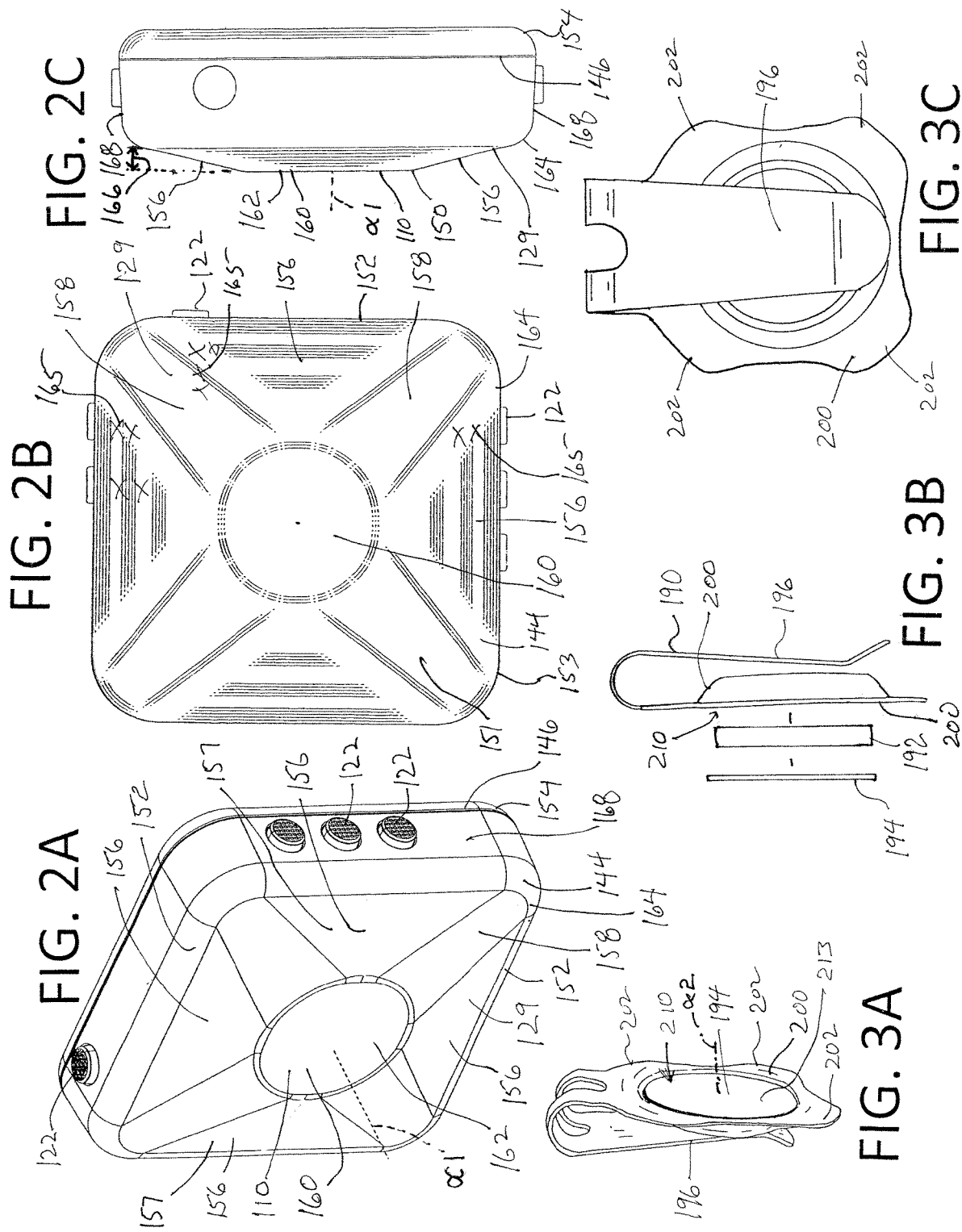

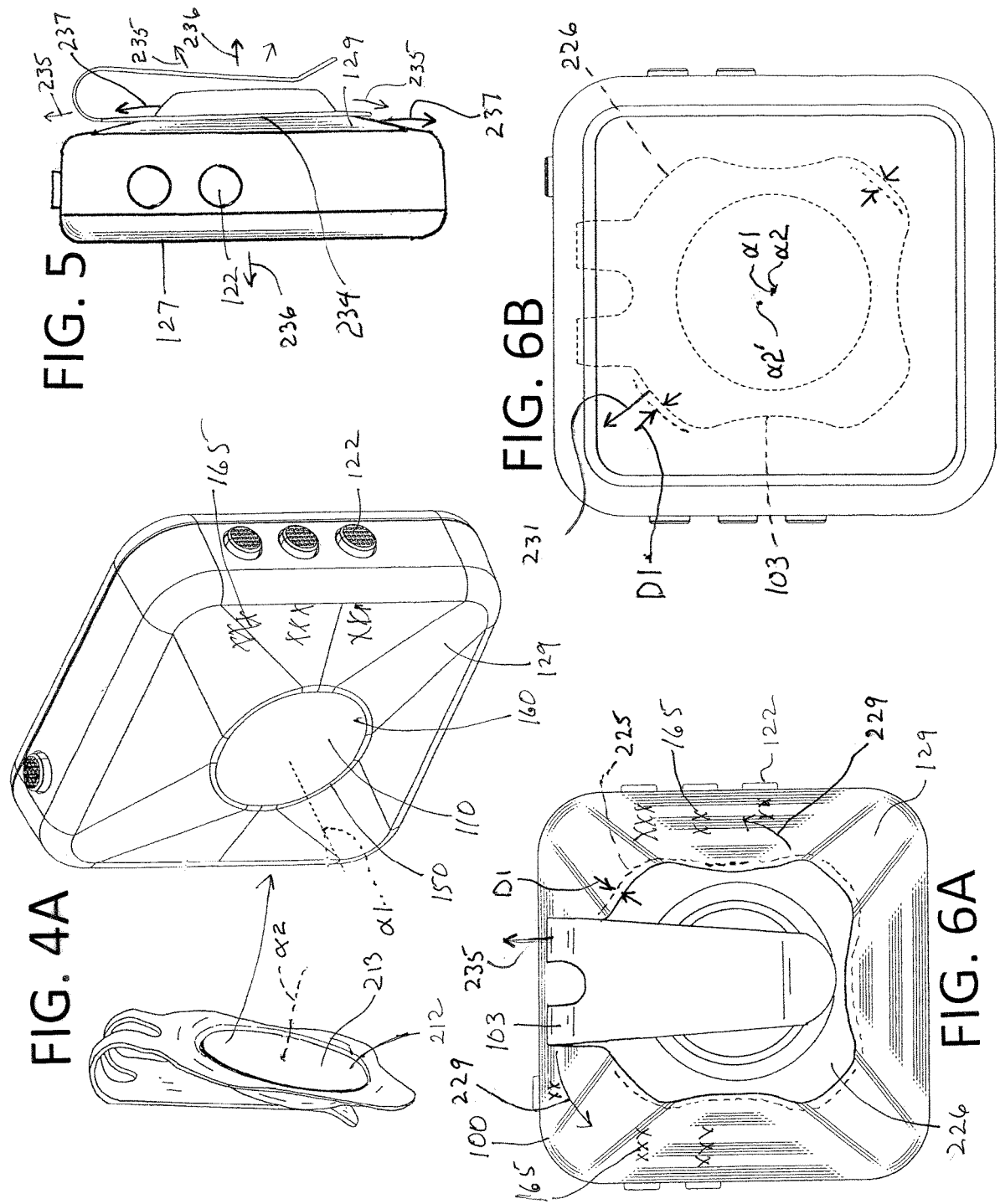

GOLF RANGEFINDER DEVICE WITH INTEGRAL MAGNET MOUNT

BACKGROUND OF THE DISCLOSURE

Unlike sports such as baseball, tennis, soccer and football, the sport of golf does not use a standardized playing area. Accordingly, the player's ability to cope with the varied terrains encountered on different golf courses is an important part of game strategy. A golf course typically consists of either 9 or 18 holes with each hole having a cup surrounded by a putting green. A flagstick or "pin" is received in the cup making the location of the cup visible from a distance. Each hole also includes a teeing region or "tee box" that is set off with two markers showing the bounds of the legal tee area. A fairway extends between the tee box and the cup. Golfers strive to shoot low golf scores, that is, going from tee to cup in a minimal number of strokes.

A variety of obstacles and hazards are typically placed between the tee box and the pin. These obstacles and hazards may including sand bunkers, trees, ponds, lakes, rivers, shoreline, creeks, un-grassed areas, and natural vegetation areas, which may be located on the sides of fairways or in cases in the fairways. Generally, the fairway is far from perfectly flat and may have significant undulations and changes in elevation. Knowing at distances to the green and/or the pin, and to such hazards, and making the appropriate shot based on such distances is necessary to excel in the game of golf.

A further consideration in golf is the pace of play. Maintaining a good pace of play is one of the main rules of golf etiquette. At times this is very important as a slow player or players can back up an entire course and disrupt scheduled tee times. Playing partners and groups behind slow players seriously frown upon slow play.

Within recent decades, electronic rangefinder devices have been introduced for providing distance measurements to aid golfers. These rangefinders including laser rangefinders and rangefinder devices utilize the Global Positioning System (GPS). Such GPS rangefinder devices store golf course layouts and with the GPS capable device establish the location of the rangefinder device with respect to the golf course and with the course layout stored in the GPS device, the device can calculate and display the distances to the middle, front, and rear of the green on the current hole as well as the distance to hazards. The GPS rangefinder devices are also combinable with laser rangefinders providing Electronic rangefinder devices are ubiquitous on golf courses. These rangefinder devices need be readily accessible and easily manipulatable as they may be used for almost all shots from the tee to green approach shots. Discrete GPS rangefinder devices, without the laser rangefinder, have become miniaturized to the extent that they can be worn as a watch or easily clipped to the golfer's apparel or to a golf bag.

In addition to considering distances to the green and hazards, accomplished golfers may consider many other variables on each shot, including weighing risks of a particular shot against potential rewards. For such accomplished golfers there is considerable mental focus on "the shot" and distractions need to be avoided.

Any improvement in ease of use and reduction in the complexities of use, including stowing, retrieval, grasping, operating, and viewing of the rangefinder devices would be advantageous to golfers and welcomed to the golf community as such would facilitate maintaining a proper pace of play and minimize distractions in the preparation for and the taking of shots.

SUMMARY

A golf rangefinder system has a miniaturized GPS golf rangefinder device that provides distances to the front, middle and back of a green, and has a magnetically attachable accessory clip. In embodiments, the device has a housing with a display screen for distances, a user interface on the housing, circuitry and a battery in the housing, and a rearward housing portion with convexity and a magnet positioned in the housing at the central distal portion of the convexity. An accessory may be configured as a clip and has a receptacle portion with a concavity conforming to the convexity at the rearward housing portion. A magnet complementary to the magnet in the housing is centrally positioned in the concavity of the receptacle portion whereby when the accessory is positioned on or near the convexity of the rearward housing portion, the accessory is magnetically drawn to the device by the complementary magnets and the accessory locates and secures itself on the convexity.

A feature and advantage of embodiments is that the accessory is slidingly removable in multiple directions from the device and vice versa. Moreover, the device and the accessory are rotatable with respect to each other when they are attached.

A feature and advantage of embodiments is a magnet to magnet attachment system for a GPS golf rangefinder device and accessory where the device has a housing, where a portion of the housing is utilized to provide an interface portion for the accessory, the portion of the housing having an exterior surface with no recesses and no concavities. The portion of the housing may be the entire rearward side the device with a display screen on a forward side. Such an arrangement provides an elegantly simple design that keeps manufacturing costs low with the simple design, and no external concavities or recesses, for example a simple clam shell configuration. Consequently the consumer price stays low.

Moreover, the receptacle of the accessory is fixable in an attachment region on the convexity that is not a single fixed point, rather the attachment location extends radially outward from a "dead center" position defining the attachment region. In embodiments the region extends a distance of about 0.2 inches in all directions radially from the dead center attachment location of the accessory. Additionally, the receptacle can move when attached about 0.2 inches from dead center and still maintain a robust magnetic attachment without magnetic decoupling. Upon such radial movement, particularly beyond 0.2 inches, the receptacle and device tend to re-center.

In embodiments, a miniaturized GPS golf rangefinder device has a planar and generally square front side having rounded corners, the front side with a display screen, four lateral sides that are generally rectangular with rounded corners, a generally square shaped rearward side with rounded corners and a central projection. A magnet is positioned in an interior of a housing at the central projection. The housing having an exterior planar surface at the magnet, the exterior planar surface conforming in size to the magnet. A magnetic accessory is sized to be conformingly received at the rearward side of the GPS golf rangefinder device. The accessory having a receptacle portion with a central magnet therein, the receptacle portion sized to the central projection.

In embodiments, the rearward side has projection that extends rearwardly at least 0.06 inches and less than 0.25 inches. In embodiments the concavity of the receptacle has a depth of at least 0.04 inches and less than 0.20 inches. In embodiments, the device when attached to the accessory, with the accessory fixed in place, requires a force exceeding 2 pounds to separate the device in a direction normal to the device display and the receptacle. In embodiments, the device when attached to the accessory, with the accessory fixed in place, will magnetically decouple with a lateral shear force of greater than three pounds. In embodiments, the device when attached to the accessory, with the accessory fixed in place, requires a lateral shear force of greater than 2 pounds to decouple the magnetic coupling and separate the device in a direction parallel to the device display surface, that is, parallel to the greatest dimension of the device. In embodiments, a lateral shear force of 1 pound or less will not decouple the magnetic coupling and separate the accessory clip and device.

A feature and advantage of embodiments is that the accessory is separable from the GPS golf rangefinder device in any rearward or lateral direction from the GPS device. Similarly the GPS golf rangefinder device is separable from the accessory in any forward or lateral direction facilitating easy separation when the accessory is attached to something. Such capabilities facilitates the advantageous easy separation of the two components without the need to utilized specific relative directional motions allowing a grasp and removal with minimal effort.

A feature and advantage of embodiments is that the GPS golf rangefinder device can be utilized and conveniently pocketed in that the accessory clip is readily removable and stored separate from the device. The device being miniaturized and configured to easily slide into a pocket and be removed from the pocket. The accessory clip having a profile less than the perimeter profile of the device. Prior art miniaturized GPS rangefinder devices did not have an accessory clip with a size reduced to be less than the profile of the device, nor that would allow features such as easy removability of the device from the accessory in different directions, nor that would allow magnetic attachment of the device to metal posts of a golf cart without utilizing a separate accessory. The small accessory clip, magnetically attached, provides improved pocketing of the device in the user's pocket with or without the accessory clip attached thereto.

In embodiments, the rearward side of the GPS golf rangefinder device has operating indicia at the edge portions of a rearward housing portion. In embodiments, the accessory clip receptacle portion attaches to said rearward housing portion and has a perimeter that is interior to the operating indicia thereby allowing the indicia to be entirely visible to a user with the accessory clip attached thereto.

A feature and advantage of embodiments is the combination of optimal size for handling and reading the display, while still being easily wearable, and while still being light weight. The inventors have recognized that the light weight allows the use of a high integrity magnetic securement using the GPS rangefinder device magnet for attaching directly to a metal post or component of a golf cart as well as to the accessory clip that is then attached to a golf bag or user's apparel. For example, due to the light weight, for example less that about 2 ounces, bumps are less likely to disengage the magnet from the metal post or accessory clip as compared to a device with a greater weight. Additionally size and weigh are optimal for easy pocketing and removal.

Additionally, the receptacle can move when attached from dead center about 0.20 inches from dead center and still maintain a robust magnetic attachment. This "cushion zone" also facilitates the integrity of the accessory to device attachment during bumps or jolts.

A feature and advantage of embodiments is a miniaturized GPS golf rangefinder device that provides distance readouts to center of green, front and rear edges of the green, the device weighs less than 3 ounces. In embodiments, the device weighs less than 2 ounces. In embodiments, the device has a greatest height or width dimension of less than 2.5 inches. In embodiments, the device has a square appearance with rounded corners when viewing the display. In embodiments, the display side of the device having a width of less than 2.6 inches and a height of less than 2.6 inches. In embodiments, the display side of the device, as defined by its housing, having a width of less than 2.3 inches and a height of less than 2.3 inches. In embodiments, the device, as defined by its housing, has a maximum depth of 0.95 inches. In embodiments, the device, as defined by its housing, has a maximum depth of 0.80 inches. In embodiments, a feature and advantage is that each exterior corner of the housing of the GPS golf rangefinder device is rounded and has a radius of 0.12 inches or greater. In embodiments, a feature and advantage is that each exterior corner of the housing of the GPS golf rangefinder device is rounded with has a radius of 0.10 inches or greater. In embodiments, the total volume of the GPS golf rangefinder device is about 4.75 cubic inches or less. In embodiments, the total volume of the GPS golf rangefinder device is about 3.75 cubic inches or less. In embodiments, the total volume of the GPS golf rangefinder device is greater than about 2.50 cubic inches. In embodiments, a feature and advantage is that each exterior corner of the housing of the GPS golf rangefinder device has a radius of 0.135 inches or greater. In embodiments, a feature and advantage is that each exterior corner of the housing of the GPS golf rangefinder device has a radius of 0.1 inches or greater. Such a device with the rounded corners provides easy stashing and removal from pockets and a comfortable ergonomic feel when handling.

In embodiments, a two magnet holding system comprises a golf rangefinder device and an accessory. In embodiments, the golf rangefinder device comprises a housing defining a cavity, the housing having a forward or bezel portion and rearward portion, the rearward portion having a central projection providing a convex surface generally corresponding to the shape of a truncated four sided pyramid with rounded corners intermediate each of the four sides. A truncation of the pyramid having a planar surface. In embodiments, the accessory may include a clip configured as a hook-shaped spring member and a receptacle portion for mating with the housing of the golf rangefinder device. In embodiments, the receptacle portion defines a concavity conformingly shaped to receive a convexity on a rearward portion of the housing. In embodiments, the receptacle portion and the base are dimensioned and configured to provide a self-alignment action as the convexity of the base is received in the three-dimensional shaped recess of the receptacle. In embodiments, a first magnetic member is fixed to the housing of the golf rangefinder device and a second magnetic member is fixed to the clip. In embodiments, the first magnet is secured in the housing and is not exteriorly exposed.

A feature and advantage of embodiments is a two magnet holding system including a golf rangefinder device and a clip that allows quick and easy attachment of the golf rangefinder to article of clothing such as shirt, pants and/or belt or to a golf bag. In embodiments, the device has a displacement volume less than 3.5 cubic inches. In embodiments, the device has a weight of less than 3 ounces. In embodiments. The device has a maximum dimension of 3 inches. In embodiments, an interface between the device and the clip is a concave surface and a convex surface. In embodiments a magnet in the device is secured in an interior of the device and is not exposed exterior of the device. In embodiments, the magnet is positioned behind a thinned wall portion of the housing for transferring maximum magnetic pull.

A feature and advantage of embodiments is a golf rangefinder device comprising a housing and one or more magnets supported by a side wall. In embodiments, the side wall supporting the one or more magnets includes a smooth outer surface for easy cleaning and for reducing the likelihood that debris will collected. In embodiments the housing arrangement minimizes component connection joints that can accumulate and trap dirt and debris. In embodiments, the side wall supporting the one or more magnets includes no exterior grooves to collect debris. Moreover, the smooth outer surface with rounded corners facilitate easy pocketing and withdrawal of the device.

A feature and advantage of embodiments is a golf rangefinder device including a housing defining a cavity, the housing including a pair of opposing housing portions, each housing portion being integrally formed from a single piece of thermoplastic material. In embodiments, the housing portions include a front portion and a rear shell portion. In embodiments, this arrangement allows the housing to be fabricated using automated and efficient thermoplastic injection molding processes.

A feature and advantage of embodiments is a golf rangefinder device comprising a housing and one or more magnets supported by the housing. The one or more magnets allow the golf rangefinder device to be quickly stowed as magnetic force from the magnet fixes the golf rangefinder device to an object such as an upright post of a golf cart. The one or more magnets allow the golf rangefinder device to be stowed in a manner and location that makes the golf rangefinder device readily accessible. A feature and advantage is that a rearward wall has a central projection containing the magnet with an exterior planar surface at the peak of the projection. The projection provides a separation of the device from the metal member to which it is directly attached. That is, the margin about the rearward wall is separated from the metal member (presuming the metal member is planar) by a gap equal to the projection distance. This facilitates grasping of the device for removal or adjustment, such as a rotation to make the screen upright. However the projection is subtle enough that is does not noticeably inhibit pocketing the device. In embodiments the projection is about 0.10 to 0.13 inches.

A feature and advantage of embodiments is a golf rangefinder device comprising a housing and one or more magnets, the one or more magnets being positioned so that access to controls of the golf rangefinder device are not blocked when the device is fixed to an object using the one or more magnets, or fixed to a magnetic accessory.

A feature and advantage of embodiments is that the golf rangefinder device is be readily stowable so that it is out of the way when not needed. A feature and advantage of embodiments is that the golf rangefinder device is readily accessible, so as to be quickly and easy retrieved from a stowed position.

A feature and advantage of embodiments is that the magnetically attachable accessories can include other accessory attachment devices that an accessory clip; for example straps, carabiners, and clamps. The magnetically attachable accessory can also include electronic components such as a charger for the battery whereby with the accessory connecting to the golf rangefinder and becomes magnetically coupled a charger becomes inductively coupled to the circuitry so as to charge the battery. In embodiments, the GPS rangefinder device could also magnetically attach to a laser rangefinder such that a single unit provides both laser ranging and GPS ranging. In embodiments a GPS rangefinder device is sold with more than one magnetically attachable accessory. In embodiments, a GPS rangefinder device is sold with a magnetically coupleable accessory that has at least one of a clip, a carabiner, or a strap as part of the accessory and is also sold with a magnetically coupleable charger unit accessory, both accessories attachable at the same magnetic attraction region. A feature and advantage is a magnetic attraction region on a device that utilizes the attraction region for both connection of a non-electric accessory, such as an attachment device comprising a clip, a strap, or a carabiner, and also for connection to an electrical accessory such as a charger, a supplemental power supply, an audio device. A feature and advantage of the rangefinder device utilizing a magnetic coupling for more than one accessory is that consumer utility and consumer desire for the product is enhanced. Packaging the device with more than one magnetically attachable accessory it is believed would drive consumer desirability and thus enhance sales.

A feature and advantage of embodiments is that the rangefinder has a planar front face where the display screen is located and a subtly projecting rear face such that a user when grasping the device, without looking at the device, can ascertain which side is the forward side and which side is the rearward side, minimizing the manipulation to raise the device to a use and viewing position. A feature and advantage is that each of four side wall are inclined inwardly from the front side to the rear side allowing a larger front side where the display is position compared to the rearward side that centrally receives the accessory. Such a configuration accommodates the internal arrangement of components, for example the circuit board with display screen attached thereto is positioned forwardly at the front wall portion and has the largest area to be accommodated, the battery, positioned next has the second greatest area to be accommodated, and the magnet at the rearward wall portion has the least amount of area to be accommodated. Thus, an optimal miniaturization has a housing with a front to rearward taper. In embodiments, the The above features and advantage provide ease of use and facilitate quick retrieval, access, operation, viewing, and restowing thereby facilitating pace of play and minimizing distractions to the golfer. The above summary is not intended to describe each illustrated embodiment or every implementation of the present disclosure.

DESCRIPTION OF THE FIGURES

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A is a rear perspective view of a device in accord with an embodiment.

FIG. 2B is a rear elevation view of the device.

FIG. 2C is a top plan view of the device.

FIG. 3A is a perspective view of an accessory clip in accord with an embodiment.

FIG. 3B is a side elevation view of the accessory clip of FIG. 3A.

FIG. 3C is a rear elevation view of the accessory clip of FIG. 3A.

FIG. 4A is a perspective view of the mating interfaces of the accessory clip and the device.

FIG. 5 is a side elevation view of the device and accessory clip mounted thereto.

FIG. 6A is a rear elevation view of the device and attached accessory clip in accord with embodiments.

FIG. 6B is a front elevation view of the device and attached accessory clip of FIG. 6A.

Figure 1A:
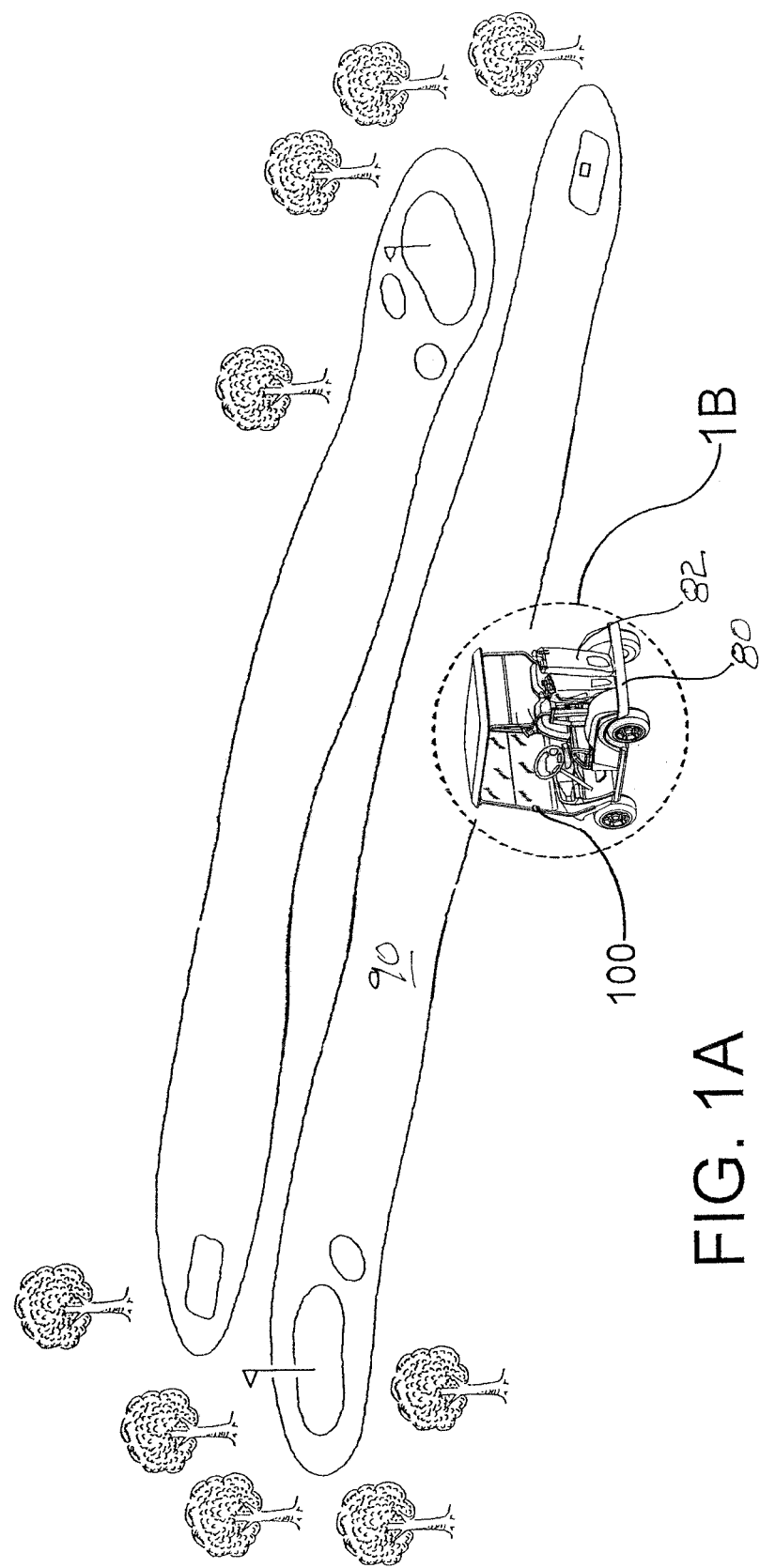
FIG. 1A is a stylized perspective view showing a rangefinder and a golf cart in use on a golf course.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 1B:
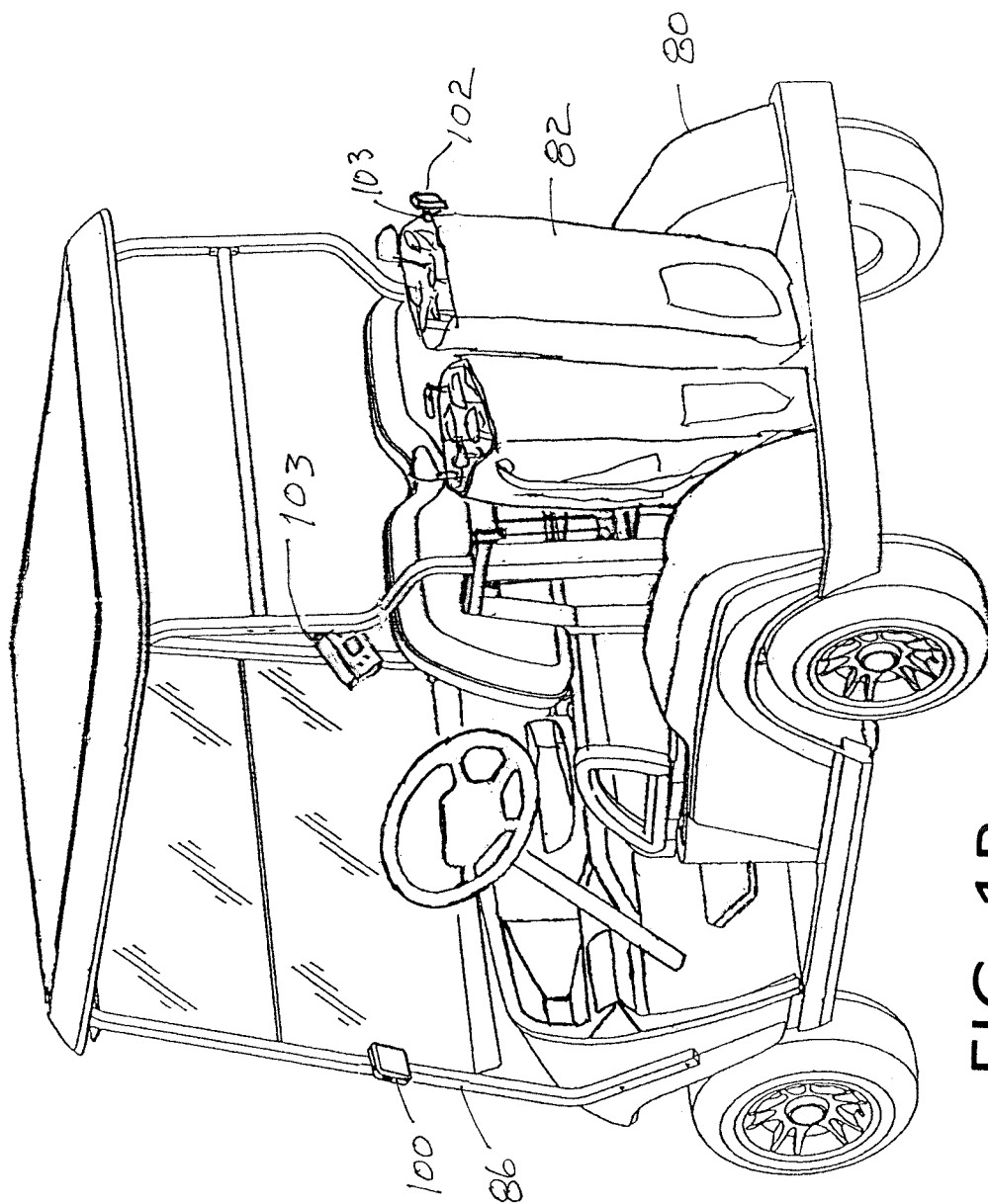
FIG. 1B is an enlarged detail view showing rangefinders magnetically attached to golf cart shown in FIG. 1A and to a golf bag.
Figure 1D:
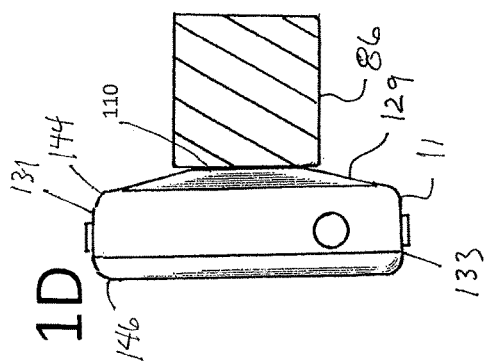
FIG. 1D is a cross sectional view of the rangefinder of FIG. 1C from above through the steel support member.
Figure 1E:
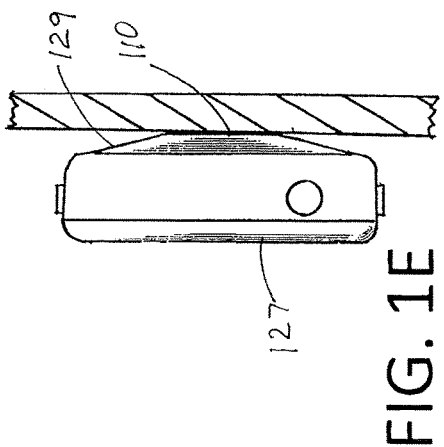
FIG. 1E is a cross sectional view of the rangefinder attached to a metal plate with a rear concavity of the rangefinder illustrating the standoff of the device from the surface of the metal plate.
Figure 1C:
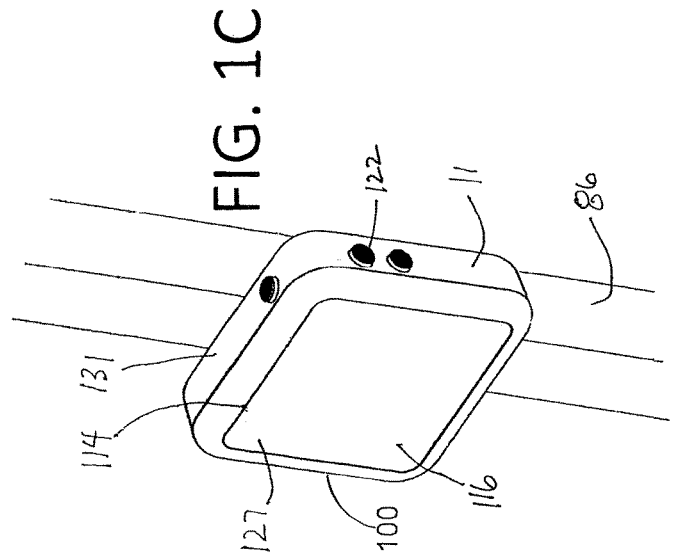
FIG. 1C is an enlarged detail view showing the GPS golf rangefinder shown in FIG. 1B attached to an upright steel support member of the golf cart.
Figure 1F:
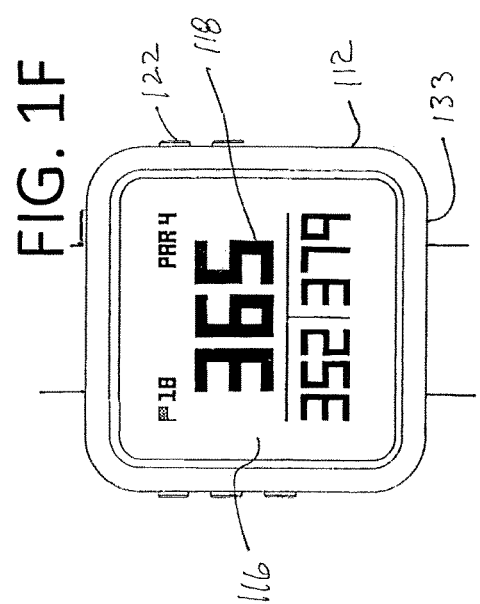
FIG. 1F is a front elevational of the rangefinder attached to the golf cart post of FIG. 1C with the display providing information.

Referring to FIGS. 1A and 1B a golf cart 80 with bags 82 thereon is illustrated on a golf course 90. FIG. 1B depicts the golf cart 80 with rangefinder devices 100, 102, 103 according to embodiments attached to the golf cart and one of the bag. GPS golf rangefinder device 100 is magnetically attached to the golf cart upright support post 86. GPS golf rangefinder device 102 is attached by way an accessory 103, configured as an accessory clip, to a golf bag. Laser rangefinder device 103 is magnetically attached to an upright support post.

Referring to FIGS. 1C, 1D, 1E, and 1F, The GPS golf rangefinder device 100 with a magnetic attraction region 110 of the device housing 112 is attached to ferrous metal members, such as steel posts 86 at a magnetic attraction region. Exteriorly, the GPS golf rangefinder device 100 has the housing 112 with a bezel 114 surrounding a display screen 116. The display screen for display information 118 such as yards to the front, center and rear of a green, the current hole, and the par stroke number of the hole. Additionally operational controls configured as pushbuttons 122 extend out sidewall portions of the device.

Referring to FIGS. 1C-2C, in embodiments, generally the GPS golf rangefinder device has a forward side 127, a rearward side 129, a top side 131, a bottom side 133, and two lateral sides 135, 137. The housing 112 has a forward or bezel portion 142 and a rearward portion 144 that meet at a juncture 146. The rearward portion has a projection or convexity 150 with a convexity surface 151. The convexity is centrally positioned with respect to the device. The convexity and generally the device has an axis α1. The convexity 150 or projection extends to edge portions 152 of the rearward side around an entire reward side periphery 153. The rearward edge portions 152 and forward edge portions 154 have surfaces 155 that are rounded with a radius of, for example, about 0.12 inches or greater. The edge portions for the purpose of dimensional aspects where the corner radius ends on the surface of the edge portions. As best shown in FIGS. 2A-2C, the convexity may have planar portions 156 with planar surfaces 157 at each of the four sides of the convexity, with the planar surface portions joined by smooth rounded corner surface portions 158. The planar portions are positioned to have an interior angle with respect to the 1 to 15 degrees At the most distal portion 159 of the convexity is a plateau surface portion 160 with a outwardly facing planar surface 162. From the most distal portion, the convexity diverges to the margins 164 of the rearward side 129. The convexity is generally in the shape of a four sided truncated pyramid with rounded corners. The truncation presenting the planar surface 162. The surface extending circumferentially about the central planar area due to the planar side and rounded corners has an undulation. The undulation can provide favored rotational positions for the accessory clip. The concavity may have cooperating undulations. In other embodiments the surface can be non-undulated, the convexity could be frusto-conical, or a truncated dome shaped. In other embodiments there could be pronounced undulation with a sinusoidal or saw-tooth undulation on both the convexity and concavity about the magnetic attraction region with the number of undulations defining the number of favored rotary positions. Indicia 165 associated with the push buttons may be provided on the rear convexity surface 151.

The convexity may be subtle, for example extending a distance 166 of 0.25 inches or less rearwardly from the rearward edge portions. See in particular FIG. 2C.

As best shown in FIG. 2C, in embodiments, the housing side wall portions 168 may have a slight taper inwardly from the forward side to the rearward side.

Figure 7:
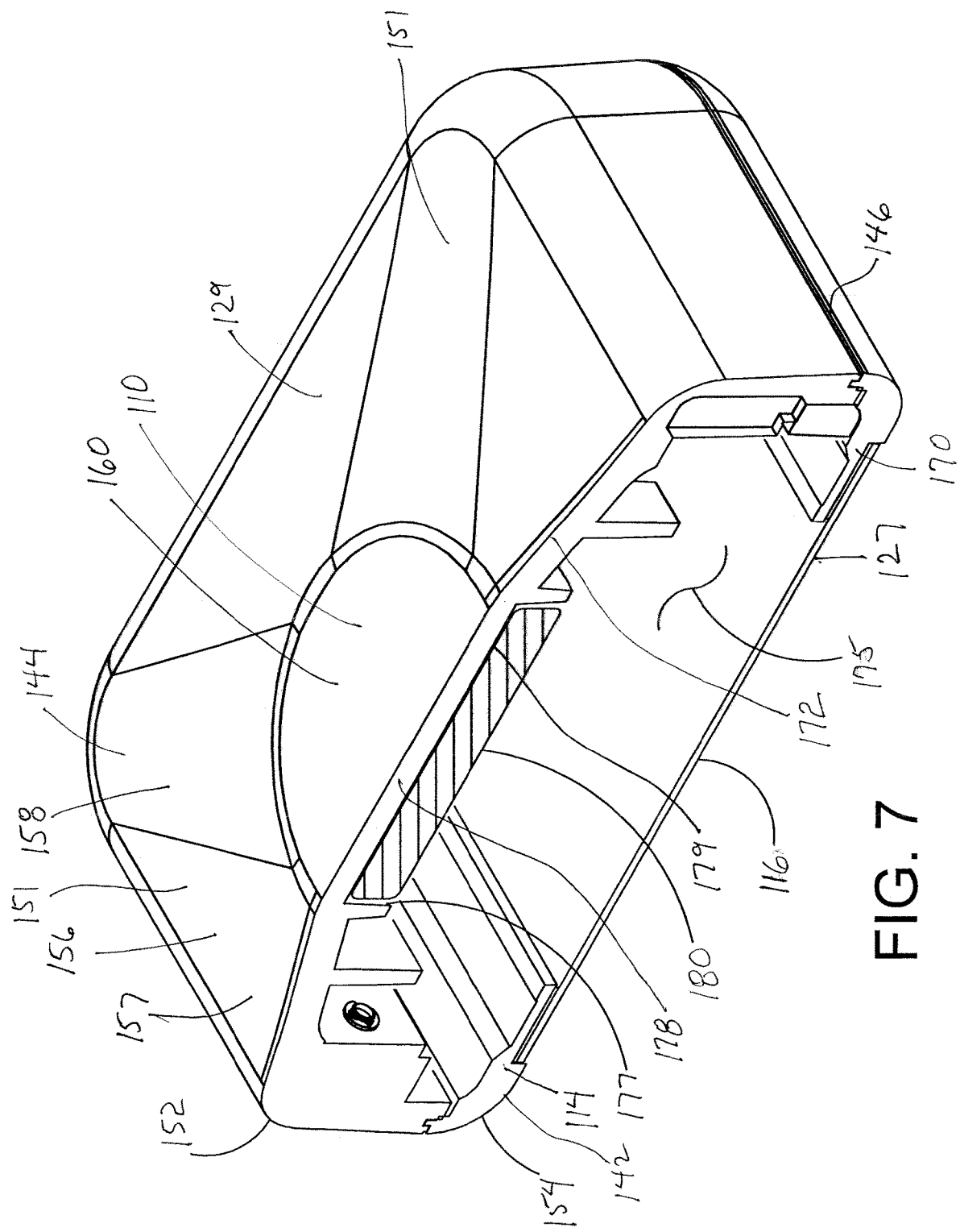
FIG. 7 is a cross-sectional view of a rangefinder device in accordance with an example embodiment.
Figure 8:
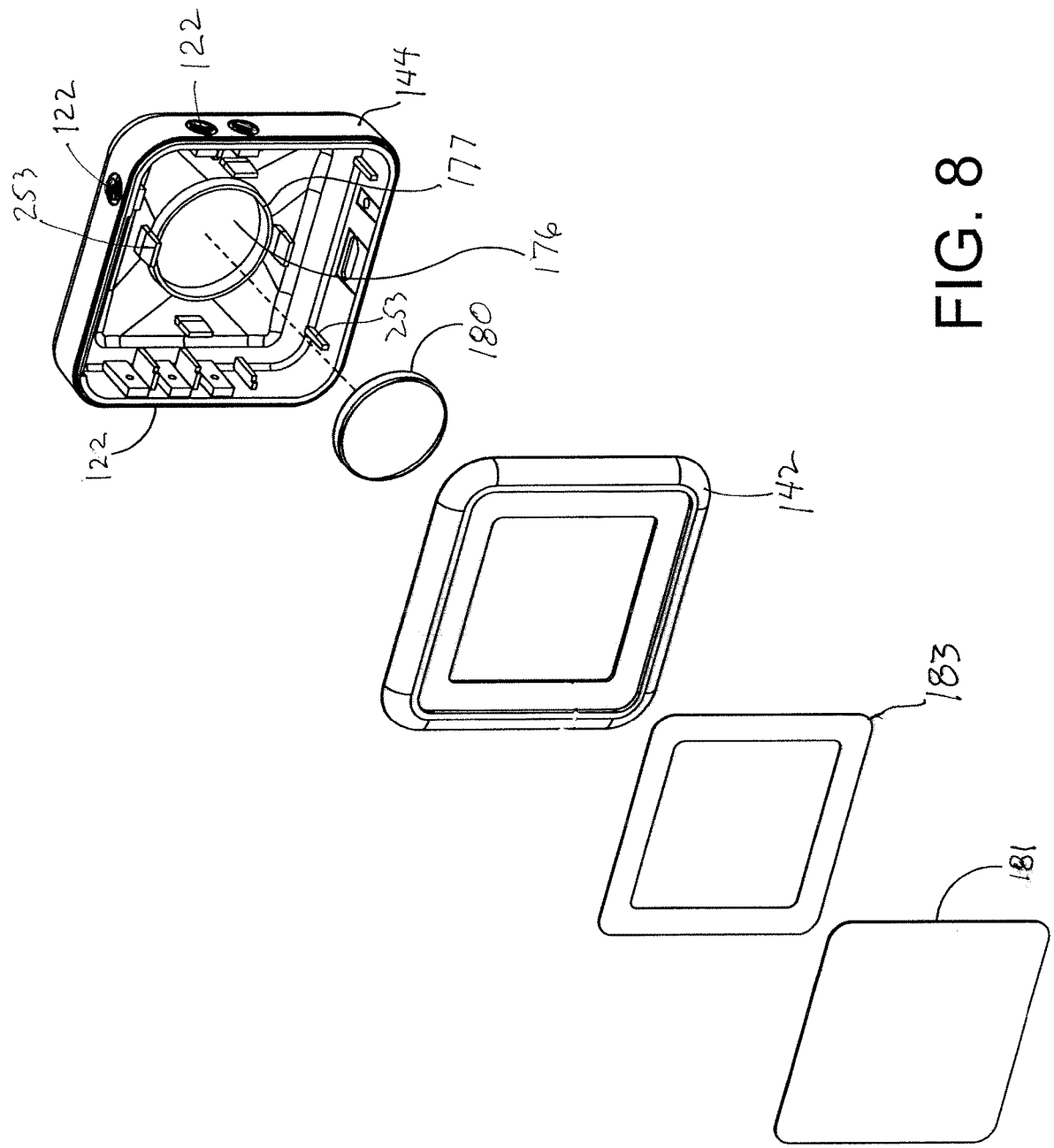
FIG. 8 is an exploded perspective view of a rangefinder device housing and magnet in accordance with an example embodiment.

Referring to FIGS. 7 and 8, details of the housing 112 are illustrated. The forward and rearward housing portions 142, 144 have a respective forward wall portion 170 and rearward wall portion 172 as depicted and define an open interior 175. The rearward wall portion having a recess 176 defined by an annular boss 177 that receives a magnet 180. The rearward housing portion having a thinned wall region 178 at the magnet, the magnet may be adhered to the thinned wall region in the recess with a suitable adhesive 179. A transparent screen cover 181 is adhered to the forward housing portion 142 by a suitable adhesive such as two sided tape 183.

Referring to FIGS. 3A to 3C, an accessory clip 103 is illustrated in detail and generally comprises a metal body 190, a second or accessory magnet 192, and a magnet cover 194. The metal body has a spring clip portion 196 and a receptacle portion 200. The receptacle portion may have four lobes 202 and a recess 210 for receiving the magnet 192 and the magnet cover 194. The receptacle portion, including the magnet and magnet cover, present a concavity 212 that conforms to the convexity 150. The magnet cover presents a second magnetic attraction 213. The concavity having an axis $\alpha 2$ with is also the axis of the disk shaped magnet. The body may be formed of spring steel whereby the clip portion is resilient and will suitably clamp to apparel, golf bags, or other convenient things. The magnet cover may be a rubbery or polymeric material that is compressible and thereby presents a cushion between the two components and that also presents a high coefficient of friction with respect to the polymer housing, greater that the coefficient of friction presented by the metal of the body to the polymer housing, particularly as the material is compressed due to the magnetic attraction between the first and second magnets.

Figure 4B:
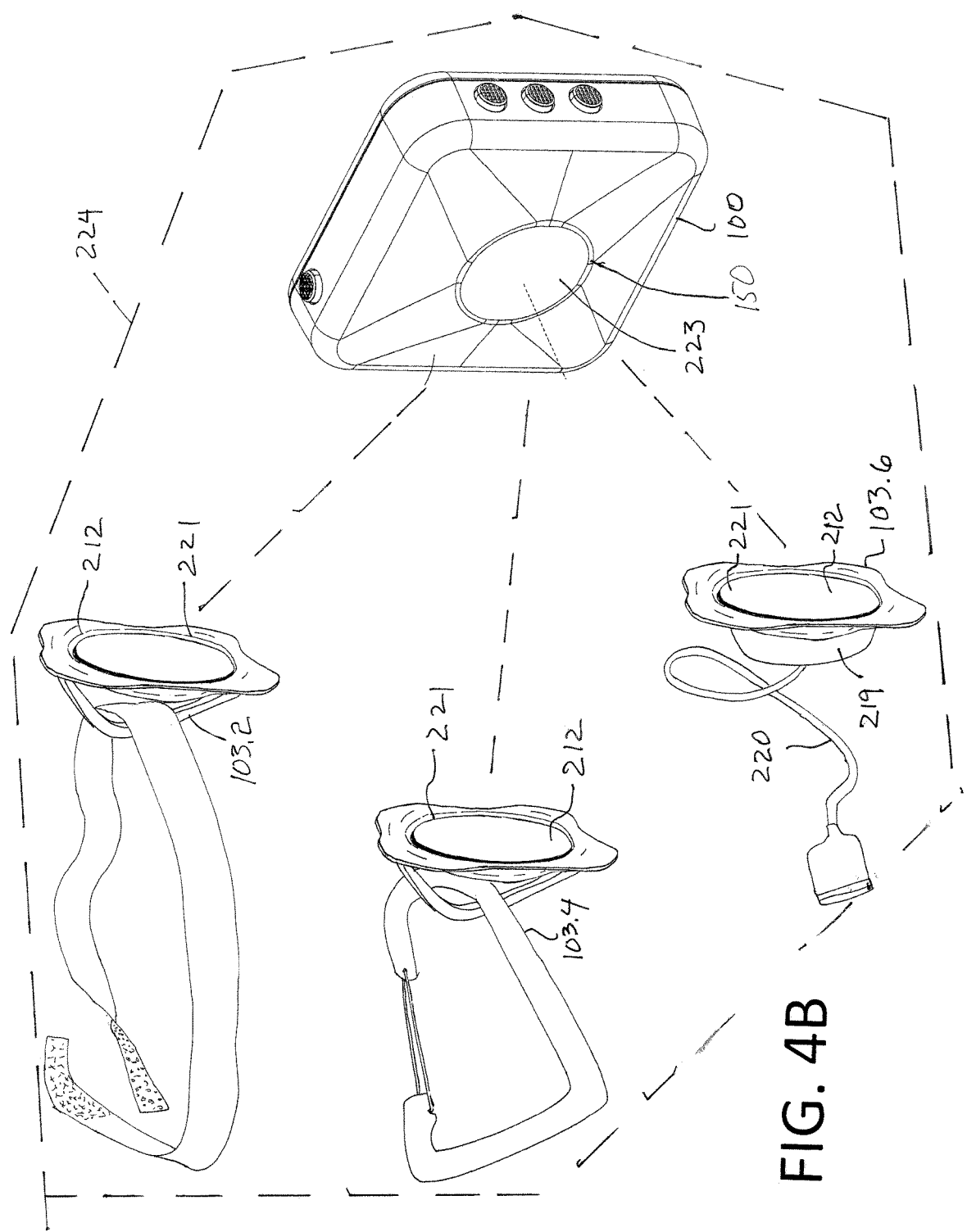
FIG. 4B is a perspective view of the mating interfaces of the three accessories and the device.

Referring to FIGS. 4A and 4B, different accessory embodiments are depicted. FIG. 4B illustrates three accessories 103.2, 103.4, 103.6 compatible with the GPS golf rangefinder device. The accessory 103.2 has a strap 217 with hook and loop material 217. The accessory 103.4 has a carabiner 218, and the accessory 103.6 has an inductive charger 219 with a USB cable 220. Each accessory 103, 103.2, 103.4, 103.6 having a magnetic coupling 222 defining a concavity 212 that conformingly seats on the magnetic coupling 223 with the convexity 150 of the device 100. Packaging 224, represented diagrammatically, may be provided to the GPS golf rangefinder device and a plurality of accessories therein will provide enhanced desirability to the consumer, and presumably higher sales. The description of functionality and structure of the receptacle portion of the accessory clip 103 herein also applies to the accessories 103.2, 103,4, 103.6 of FIG. 4B.

Referring to FIGS. 4A-6B, the cooperation between the accessories 103 and GPS golf rangefinder device 100 is illustrated. In embodiments, the convexity 150 and concavity cooperate along with the cooperating first magnet 180 of the device and the second magnet 192 of the accessory clip 103. The two components are pulled together and properly seated when spaced an inch or more apart when they are otherwise unimpeded. The seating is at an attachment region 225 as illustrated in FIG. 6A that extends beyond a "dead center" alignment position 226 which may be defined by the axis $\alpha 1$ of the device and axis $\alpha 2$ of the accessory clip being in alignment as illustrated in FIG. 6B. FIG. 6 also illustrates by the arrows 229 that the accessory and device are slidingly rotatable with respect to each other in embodiments. Moreover, considering the attachment region is not a singular discrete location, the accessory and the device are slidingly movable with respect to each other in radial directions as illustrated by arrow 231 in FIG. 6B. For example, the accessory can be slidingly moved at the interface 234 between the accessory and device a lateral distance D1 as shown in FIG. 6B, see also FIG. 5. This may offset the axis $\alpha 2$ of the accessory clip from the of the device axis $\alpha 1$ to an offset position identified as $\alpha 2'$ on FIG. 6B. Also FIG. 6A shows that the distance D1 may be in any lateral direction and corresponds to the attachment region 225. In embodiments, when moving the accessory clip 0.2 inches on the convexity from dead center position, the accessory clip will be maintained in the displaced position.

Still referring to FIGS. 4A-6B, the indicia 165 providing labeling for the control push buttons 122, may be fully viewable even when the accessory clip 103 is attached.

Referring to FIGS. 5-6B, this illustrates by arrows 235 that the accessory may be removed from the rearward side of the device in any rearward or lateral direction. In embodiments, there is a separation force 236 required to separate the accessory and the device, that is a tensile force along the axis $\alpha 1$ and $\alpha 2$ with the axis in alignment sufficient to magnetically decouple the accessory and the device, as indicated by arrows labeled 236. In embodiments one pound or less tensile separation force 236 will not magnetically decouple the accessory and device. In embodiments, a tensile separation force of 5 pounds along said common axis or more will magnetically decouple the accessory and the device. In embodiments, a lateral separation force 237, that is a shear separation force imparted at the interface 234, illustrated by arrows 237, will conveniently separate the accessory and device at a separation force less than the tensile separation force 236. In embodiments, a shear separation force of greater than 3 pounds will effect a magnetic decoupling between the accessory and the device. In embodiments, a shear separation force of greater than 2 pounds will effect a magnetic decoupling between the accessory and the device. In embodiments, a shear separation force of 1 pound or less will not effect a magnetic decoupling between the accessory and the device. In embodiments, a tensile force greater than 4 pounds will effect a magnetic decoupling and separation of the device and accessory. In embodiments a tensile force at the axis of the accessory and device of greater than 3 pounds will effect a magnetic decoupling and separation of the accessory and device.

Figure 9:
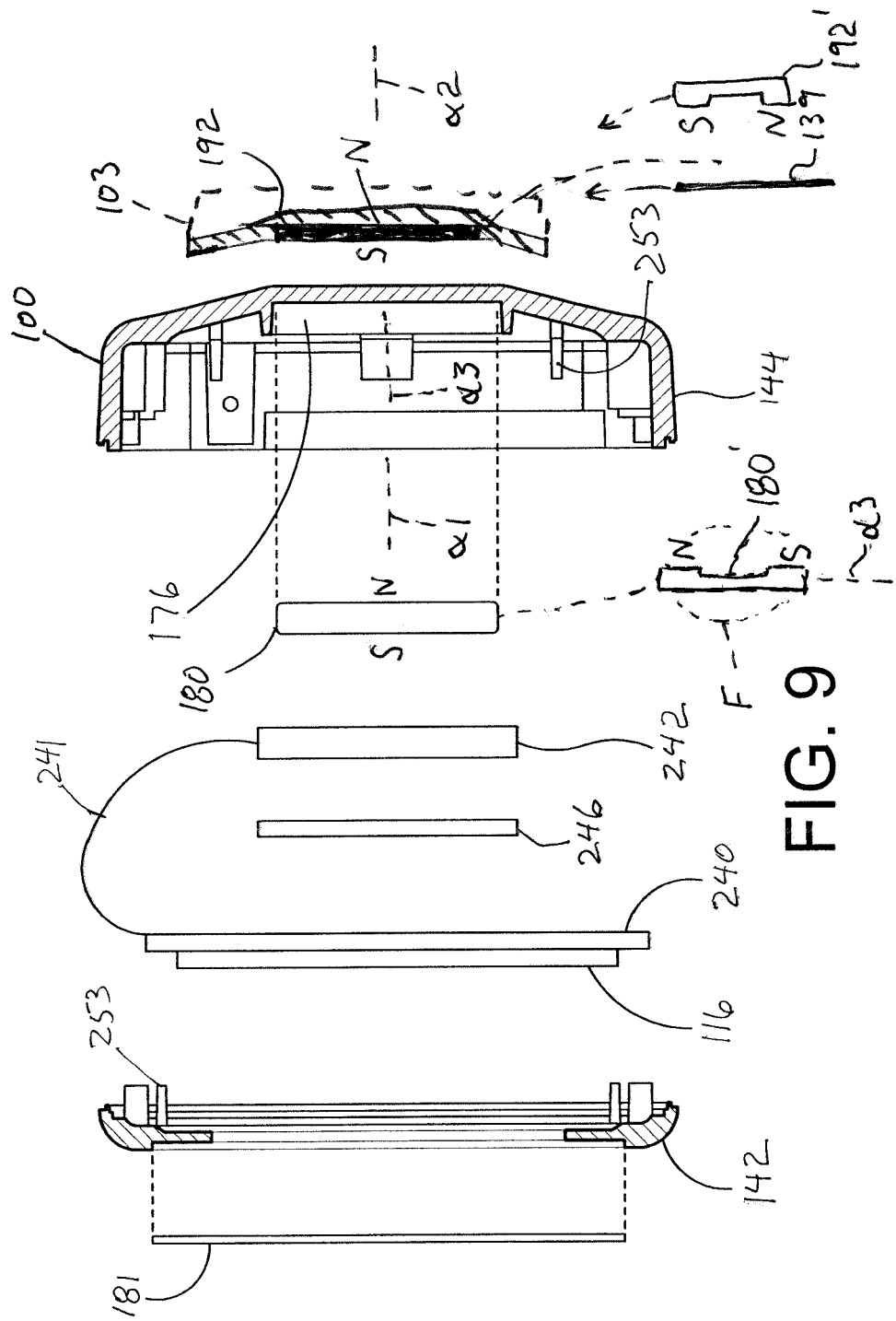
FIG. 9 is an exploded cross sectional view of a rangefinder device in accordance with example embodiments.

Referring to FIG. 9, in embodiments, the north pole N of one magnet, for example the first magnet 180, confronts the south pole S of the other magnet, for example the second magnet 192 the poles being aligned with the axis of the rangefinder device and the receptacle portion. In other embodiments, a single magnet 180' may be effectively utilized in the rangefinder and the north-south pole axis $\alpha 3$ may be transverse to the axis of the rangefinder device such that both poles are at the magnetic attraction region, see the magnet 180'. A ferromagnetic metal piece 139 in the accessory bridges magnetic flux F between the north and south poles providing a strong coupling effect utilizing the single magnet in the device and a plate in the accessory or just using the metal accessory body for the coupling piece. In other embodiments, the single magnet may be utilized in the accessory and with the and the north south poles may be transverse to the axis of the rangefinder device with a ferromagnetic metal in the accessory allowed to bridge the magnetic flux between the north and south poles. In other embodiments, two magnets may be utilized with the north south poles axis $\alpha 3$ in the device and accessory in parallel. See 180' and 192' of FIG. 9. This arrangement will preclude the full rotational capability of other embodiments.

As illustrated the device may be selectively and adjustably attached to the accessory 103 or to a metal structure, or may be utilized without the accessory attached, for example, placing the device 100 in one's pocket or in a convenient compartment of a golf bag or golf cart. The accessory 103 can be stowed, for example in a golf bag compartment.

Figure 10:
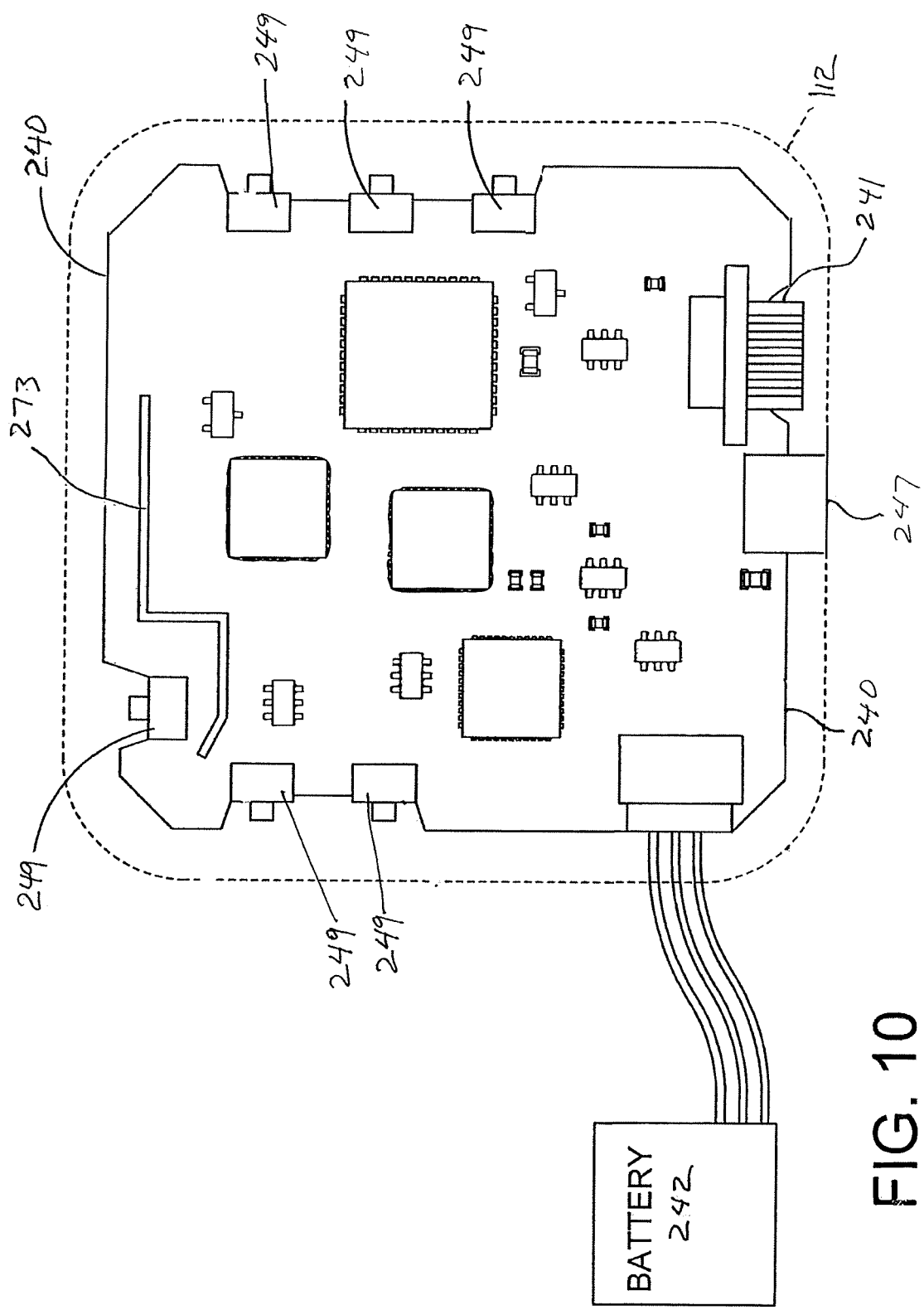
FIG. 10 is an elevation view of a circuit board and battery of embodiments.

Referring to FIGS. 8, 9 and 10, the arrangement of components in the open interior 175 of the housing 112 is illustrated. A printed circuit board 240 has the display screen 116 attached thereto by a ribbon connector 241. The circuit board is connected to a battery 242. The circuit board may have a USB port 247. Micro-switches 249 are positioned on the board to align with push buttons in the housing. The circuit board 240 and battery are sandwiched between the forward and rearward housing portions 142, 144 and may be positioned by structure 253 molded into the housing portions. A cushion 246 may be placed between the battery and circuit board.

Figure 11:
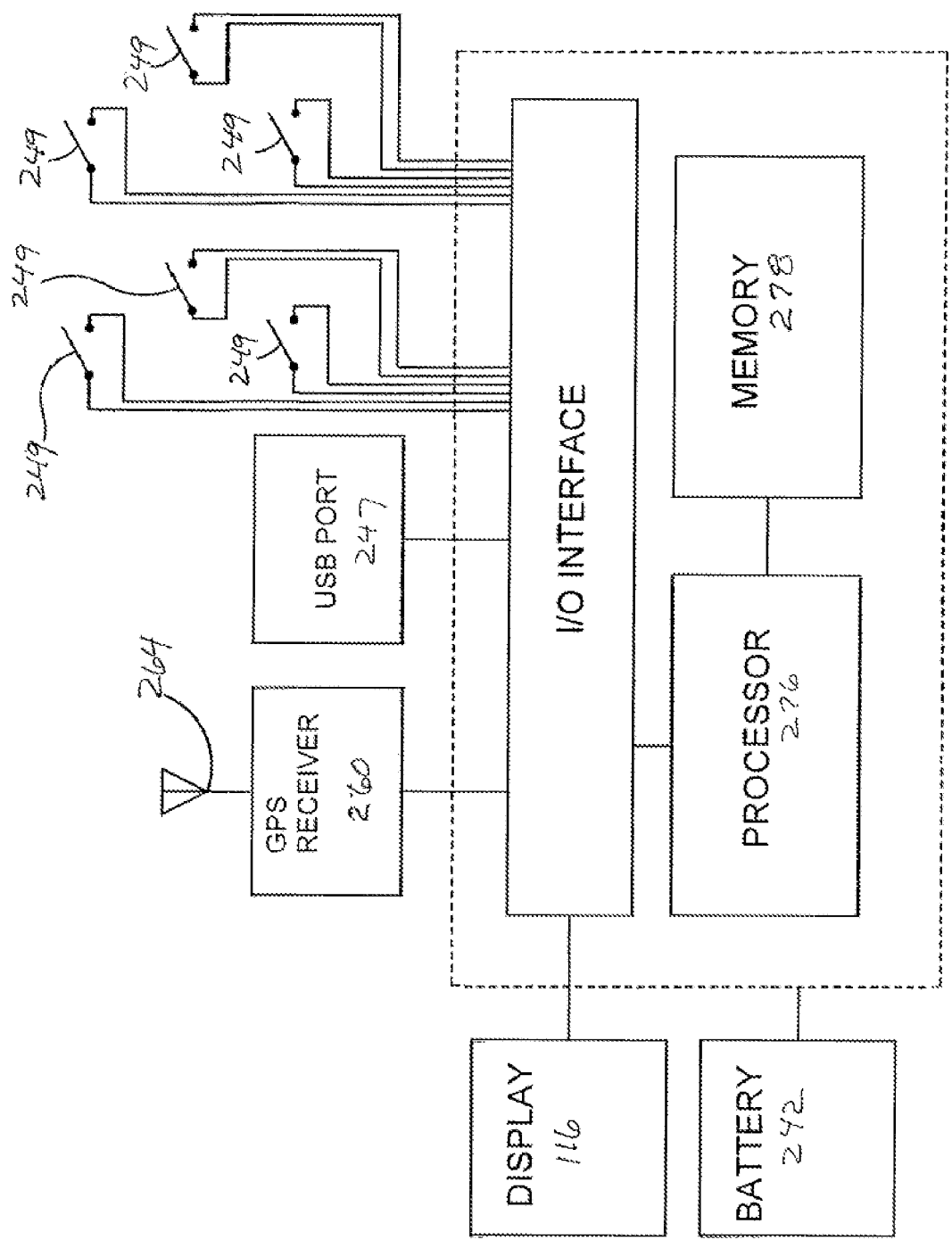
FIG. 11 is a diagrammatic view of a rangefinder device.

Referring to FIGS. 10 and 11, the rangefinder 100 may include a GPS receiver 260 for receiving information from GPS satellites and an antenna 264 operatively coupled to the GPS receiver 260. The GPS receiver 260 is operatively coupled to control circuitry 270. In embodiments, the control circuitry comprises one or more processors 276 and a non-transitory computer readable medium 278 storing one or more instruction sets. In embodiments, the one or more instruction sets include instructions configured to be executed by the one or more processors 276 to determine a present location of the rangefinder 100 based on information received from the GPS receiver 260 and identify a database record associated with a golf hole proximate the present location of the rangefinder 100. The one or more processors 276 may determine a front distance and a back distance from the identified database record. In embodiments, the front distance and the back distance are displayed on the display 116.

Referring to FIGS. 10 and 11, electronic elements of an example rangefinder 100 are shown. With reference to the figures, it will be appreciated that the rangefinder 100 includes a printed circuit board 240 supporting the circuitry 270. In embodiments, the printed circuit board 240 comprises a substrate and the substrate supports a plurality of conductive paths 273 of the circuitry 270. In the example embodiment shown, the circuitry 270 comprises the printed wiring board 240 and a plurality of electronic components fixed to the printed circuit board 240. The circuitry 270 may comprise various elements without deviating from the spirit and scope of the present invention. For example, the circuitry may comprise combinational logic, a plurality of state machines and a clock that provides a clock signal to the combinational logic and the plurality of state machines. Each state machine may comprise state logic circuitry and a state memory. The state memory may comprise a plurality of memory elements such as flip-flops. The state logic circuitry of the state machine determines the conditions for changing the logical values of bits stored in the state memory. More particularly, the state logic circuitry of the state machine logically combines the binary values of a plurality of inputs with the binary values in the state memory representing the current state to generate a binary number representing the next state. The combinational logic circuitry may comprise various elements without deviating from the spirit and scope of the present description. For example, the combinational logic circuitry may comprise a plurality of discrete electronic components. By way of a second example, combinational logic circuitry may comprise a plurality of electronic components in the form of an application specific integrated circuit (ASIC). Examples of electronic components that may be suitable in some applications include logic gates. Examples of logic gates include, AND gates, NAND gates, OR gates, XOR gates, NOR gates, NOT gates, and the like. These logic gates may comprise a plurality of transistors (e.g., transistor-transistor logic (TTL)).

Still referring to FIGS. 10 and 11, the circuitry 270 may comprise various elements without deviating from the spirit and scope of the present invention. In embodiments, for example, the circuitry 270 may comprise a processor, a memory, an input/output interface, a display, and a bus that communicatively couples the processor to the memory, the display and the input/output interface.

In embodiments, the processor may comprise a collection of one or more logical cores or units for receiving and executing instructions or programs. For example, in one or more embodiments, the processor may be configured to receive and execute various routines, programs, objects, components, logic, data structures, and so on to perform particular tasks.

In embodiments, the memory is a collection of various computer-readable media in the system architecture. In various embodiments, memory can include, but is not limited to volatile media, non-volatile media, removable media, and non-removable media. For example, in one or more embodiments, the memory can include random access memory (RAM), cache memory, read only memory (ROM), flash memory, solid state memory, or other suitable type of memory. In one or more embodiments, the memory includes media that is accessible to the electronic circuitry 270. For example, in embodiments, the memory includes computer readable media located locally in the circuitry 270 and/or media located remotely to the circuitry 270 and accessible via a network. In embodiments, the memory includes a program product having a group of one or more logical instructions that are executable by the processor to carry out the functions of the various embodiments of the disclosure.

In embodiments, the bus comprises one or more of any of suitable type of bus structures for communicatively connecting the electronic elements. In various embodiments the bus may include a memory bus or memory controller, a peripheral bus, and a processor or local bus using any of a variety of bus architectures.

In embodiments, the circuitry 270 includes an I/O interface coupled to a processor. The I/O interface may facilitate communication between the various components of the circuitry 270. In certain embodiments the I/O interface facilitates communication with input and output devices for interacting with a user. For example, the I/O interface may communicate with one or more devices such, as a user-input device and/or an external display, which enable a user to interact directly with the circuitry 270. The user-input device may comprise one or more push-buttons, a touch screen, or other devices that allows a user to input information. The external display may comprise any of a variety of visual displays, such as a viewable screen, a set of viewable symbols or numbers, and so on.

Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," "leftwardly," and "rightwardly," should not be interpreted to limit the scope of the invention recited in the attached claims.

The following United States patents are hereby incorporated by reference herein: U.S. Pat. Nos. 9,535,162, 9,518,804, 9,494,686, 9,482,489, 9,429,653, 9,400,326, 9,383,448, 9,335,415, 9,322,920, 9,295,895, 9,274,202, 9,213,101, 9,212,868, 9,197,763, 9,151,603, 9,127,910, 9,095,761, 9,068,795, 9,038,901, 9,030,651, 8,959,823, 8,909,470, 8,868,342, 8,786,837, 8,708,841, 8,638,423, 8,605,259, 8,599,362, 8,529,380, 8,477,290, 8,411,257, 8,384,884, 8,355,869, 8,314,923, 8,240,186, 8,172,702, 8,081,300, 8,072,583, 8,070,629, 8,070,628, 8,040,758, 8,020,769, 8,018,580, 7,973,912, 7,942,762, 7,922,606, 7,898,647, 7,859,650, 7,713,148, 7,684,017, 7,658,031, 7,571,052, 7,535,553, 7,508,497, 7,414,707, 7,349,073, 7,239,377, 7,118,498, 7,053,992, 6,978,676, 6,934,012, 6,873,406, 6,862,084, 6,819,495, 6,717,654, 6,583,860, 6,529,827, 6,456,938, 6,433,860, 6,263,279, 6,252,655, 6,171,199, 6,144,308, 6,133,992, 6,108,071, 6,073,352, 6,029,121, 6,023,322, 5,953,109, 5,926,260, 5,926,259, 5,903,996, 5,898,484, 5,810,680, 5,703,678, 5,652,651, 5,623,335, 5,616,903, 5,364,093, 5,311,271, 5,283,732, 5,262,837, 5,046,839, 4,136,394, 8,797,511, 8,909,470, 8,810,196, and 9,450,446. Components illustrated in such patents may be utilized with embodiments herein. Incorporation by reference is discussed, for example, in MPEP section 2163.07(B).

Embodiments of the invention include a golf rangefinder device with polymer injection molded housing defining an open interior with circuitry therein for rangefinder and display of pertinent distances on the golf course, a magnet permanently secured to the housing. The magnet attachable to metal members such as a metal post on a golf cart. In embodiments the golf rangefinder device presents a housing portion where the magnet is permanently attached defining a magnetic attachment region. In embodiments the magnet is attached exteriorly and is exposed on the device. In embodiments the magnet is attached exteriorly and is exposed on the accessory. In embodiments the magnet is attached interiorly behind a housing wall portion. In embodiments the magnetic attachment region presents a planar exterior attachment surface. In embodiments, the magnetic attachment region is a projection. In embodiments, the projection is configured as a plateau with a diverging housing portion therebelow or proximally. In embodiments, the magnet is not exposed at the exterior. In embodiments, the magnet is secured within the interior of the housing at the interior center of the housing region of the planar exterior attachment surface, and in embodiments a wall portion is thinned at the magnetic attachment region. In embodiments, the golf rangefinder device is one of a laser rangefinder device and a GPS rangefinder device. In embodiments, an accessory is attachable to the golf rangefinder device, the accessory comprising a magnet complementary to the magnet in the golf rangefinder device. The accessory may include attachment means including a spring clip, a strap, a strap with hook and loop material, a hook, a suction cup, spring loaded clamp. Additionally the accessory may be an operational accessory complementary to the golf rangefinder device. In embodiments the magnetic coupling and associated structure may be used in other applications.

In embodiments, the interface between a rangefinder with a magnet and an accessory with a magnet may be planar. In embodiments, the concavity may be on the rangefinder and the convexity may be on the accessory. In embodiments, the convexity may be differently shaped, such as dome shaped, or a truncated dome shape. The truncated pyramid shape in embodiments may have three sides or four sides and the corners between adjacent sides may be rounded or sharp. The convexity perimeter in embodiments may be spaced from the edge portion.

The above references in all sections of this application are herein incorporated by references in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A GPS golf rangefinder system comprising a GPS rangefinder device and an accessory clip, the GPS rangefinder device comprising:

a polymer housing comprising a front housing portion at a front side and having a generally square profile when viewed from the front and having a display screen bezel, the front housing portion coupled to a rearward housing portion at a rearward side and having a rearward side wall portion with a rearward edge portion extending around a periphery thereof, the rearward housing portion having a generally square profile when viewed from the rear, the front housing portion and rearward housing portion defining an interior, the rearward housing portion having an outward projecting convexity, the convexity having a convexity perimeter extending to the rearward edge portion of rearward side margin and the convexity having a centrally positioned most distal portion;

circuitry including a GPS receiver, a processor, memory, connecting to a battery, all positioned in the interior of the housing, and the circuitry further connected to a display screen positioned to be viewable within the bezel and user controls on the housing; and a first magnet positioned in the interior of the housing at the most distal portion of the outwardly projecting convexity;

the accessory clip comprising a metal body defining a hook portion and a receptacle portion having a bowl shape, a second magnet fixed in the receptacle portion, the receptacle portion and magnet defining a concavity sized to conformingly receive the convexity whereby the accessory clip is magnetically coupleable to device at the convexity;

whereby when the accessory clip is attached to the device, the metal body has a profile when viewed from the rear that is entirely interior to the rearward housing profile.

2. The GPS golf rangefinder system of claim 1 wherein the convexity and the concavity are shaped such that the device and accessory clip are attached, they are rotatable 360° with respect to each other.

3. The GPS golf rangefinder system of claim 1, wherein when the accessory clip is attached to the device, the concavity and convexity define an interface that has a plurality of favored rotary positions.

4. The GPS golf rangefinder system of claim 1, wherein each of the device and the accessory clip have a respective central axis extending through the convexity and the concavity, wherein when the accessory clip and device are magnetically coupled, the accessory clip and device have a dead center position where the axis are aligned and the accessory clip and device are slidingly movable and retainable to a position offset from the dead center position whereby the respective axis are offset from one another.

5. The GPS golf rangefinder system of claim 1, wherein the accessory clip further comprises a polymeric material layer on the second magnet, the polymeric layer being dimensionally compressed when the accessory clip and device are magnetically coupled.

6. The GPS golf rangefinder system of claim 1, wherein the accessory clip further comprises a polymeric material layer on the second magnet, the polymeric layer providing a higher coefficient of friction engaged with the polymer housing at the convexity when the accessory clip and device are magnetically coupled as compared to a coefficient of friction of a surface of the second magnet engaged with the polymer housing at the convexity.

7. The GPS golf rangefinder system of claim 1, wherein the centrally positioned most distal portion has a planar outer surface with a circular perimeter.

8. A GPS golf rangefinder system comprising a GPS rangefinder device and an accessory clip, the GPS rangefinder device comprising:

a polymer housing comprising a front housing portion at a front side and having a generally square profile when viewed from the front and having a forward screen receiving region, the front housing portion coupled to a rearward housing portion, the rearward housing portion at a rearward side of the device and having a rearward side wall portion with a rearward edge portion extending around a periphery of the rearward side wall portion, the rearward housing portion having a generally square profile when viewed from the rear, the front housing portion and rearward housing portion defining an interior, the rearward housing portion having an outward projecting convexity, the convexity having a centrally positioned most distal portion having a planar outer surface, the housing sized to fit within a geometric rectilinear shape of 2.5 inches by 2.5 inches by 0.85 inches;

circuitry including a GPS receiver, a processor, memory, connecting to a battery, all positioned in the interior of the housing, and the circuitry further connected to a display screen positioned to be viewable within the bezel and user controls on the housing; and a first magnet positioned in the interior of the housing at the most distal portion of the outwardly projecting convexity, the magnet disc shaped with a circular profile concentric with the circular perimeter of the planar outer surface;

the accessory clip comprising a body defining a spring hook portion and a receptacle portion having a second magnet fixed therein, the receptacle portion and magnet defining a concavity sized to conformingly receive the convexity whereby the accessory clip is magnetically coupleable to device at the convexity.

9. The GPS golf rangefinder system of claim 8, wherein each of the device and the accessory clip have a respective central axis extending through the convexity and the concavity, wherein when the accessory clip and device are magnetically coupled, the accessory clip and device have a dead center position where the respective axis are aligned, and wherein a separation force of one pound is applied to the device and clip at the aligned axis the device and accessory clip do not separate, and wherein a separation force of four pounds is applied to the device and clip at the aligned axis the device and accessory clip magnetically decouple and separate.

10. The GPS golf rangefinder system of claim 8, wherein each of the device and the accessory clip have a respective central axis extending through the convexity and the concavity, wherein when the accessory clip and device are magnetically coupled, the accessory clip and device have a dead center position where the respective axis are aligned, and wherein the accessory clip is magnetically decoupleable and separable from the device in any rearward or lateral direction.

11. The GPS golf rangefinder system of claim 8, wherein the geometric area defined by the forward edge portion is greater than the geometric area defined by the rearward edge portion and wherein there are four planar side wall portions extending between the forward edge portion and the rearward edge portion, and each of the four planar sidewalls are inclined inwardly from the forward edge portion to the rearward edge portion.

12. The GPS golf rangefinder system of claim 8, wherein the convexity has four planar sides with respective planar surfaces, each planar surface extending from the rearward side edge portion to the planar outer surface of the centrally positioned most distal portion.

13. The GPS golf rangefinder system of claim 8, wherein the convexity has undulations defined by the surface of the convexity extending around and radially outward from the planar outer surface of the centrally positioned most distal portion providing favored rotary attachment positions of the accessory clip and device.

14. The GPS golf rangefinder system of claim 8, wherein the device fits into a rectilinear geometric shape of 2.5 inches by 2.5 inches by 0.85 inches and wherein the device weights less than four ounces.

15. The GPS golf rangefinder system of claim 8, wherein when the accessory clip is coupled to the device, the accessory clip and device are slidingly rotatable with respect to each other and slidingly movable in any direction with respect to each other a discrete distance greater than 0.10 inches without magnetically decoupling.

16. A GPS golf rangefinder system comprising a GPS rangefinder device and an accessory, the GPS rangefinder device comprising:

a polymer housing comprising a front housing portion at a front side and the front housing portion having a generally square profile when viewed from the front and having a display screen receiving region, the front housing portion coupled to a rearward housing portion at a rearward side of the device and having a rearward side wall portion with a rearward edge portion extending around a periphery thereof, the rearward housing portion having a generally square profile when viewed from the rear, the front housing portion and rearward housing portion defining an interior, the rearward housing portion having an outward projecting convexity, the convexity having a convexity perimeter extending to the rearward edge portion of rearward side margin, the convexity extending no more than ;

circuitry including a GPS receiver, a processor, memory, connecting to a battery, all positioned in the interior of the housing, and the circuitry further connected to a display screen positioned to be viewable at the front side of the device and user controls connecting to the circuitry on the device; and a first magnet positioned at a most distal portion of the outwardly projecting convexity;

wherein the device weighs less than 4 ounces and occupies a geometric volume of less than 4.75 cubic inches;

the accessory having receptacle portion having a bowl shape with a second magnet fixed therein, the receptacle portion defining a concavity conforming to the convexity, whereby the accessory is magnetically coupleable to the device with the convexity and concavity defining an interface between the accessory and the device, the device and the accessory slidingly movable with respect to each other in a rotary direction and a lateral direction a discrete distance of at least 0.1 inches without magnetically decoupling.

17. The GPS golf rangefinder system of claim 16, wherein the rearward housing portion defines a most distal portion with a planar surface with a circular shape, and wherein the rearward housing portion has a rearward wall at the most distal portion that has a thickness less than the thickness of the rearward wall portions that connect to the most distal portion, the magnet being attached to an inward surface of the most distal portion.

18. The GPS golf rangefinder system of claim 16, where in the convexity extends rearwardly no more than about 0.2 inches from the edge portions, and wherein the convexity undulates in a circular direction about the most distal portion.

19. The GPS golf rangefinder system of claim 16, wherein the accessory is packaged for sale with at least two magnetically attachable accessories, each having a receptacle portion with a concavity, the at least two chosen from an accessory with a strap, an accessory with a carabiner, and accessory with a spring clip.

20. The GPS golf rangefinder system of claim 16, wherein the convexity is shaped as one of a truncated pyramid, a truncated dome, or a frusto-conical shape, and wherein the convexity projects outwardly from the rearward edge portions not more than 0.25 inches.

* * * * *